United States Patent [19]

Mori

[11] Patent Number: 4,741,048
[45] Date of Patent: Apr. 26, 1988

[54] ONE-WAY ADDRESSABLE SYSTEM

[75] Inventor: Hitoshi Mori, Kobe, Japan

[73] Assignee: Matsushita Electric Industrial Co., Ltd., Osaka, Japan

[21] Appl. No.: 920,195

[22] Filed: Oct. 17, 1986

[30] Foreign Application Priority Data

Oct. 17, 1985 [JP] Japan .................... 60-231566

[51] Int. Cl.⁴ .................... H01J 9/00; H04K 1/00
[52] U.S. Cl. .................... 455/4; 455/179; 455/26.1; 358/84; 358/349
[58] Field of Search .................... 455/4, 179, 185, 280, 455/293, 2, 3, 5, 6, 9, 67–69; 358/84, 86, 114

[56] References Cited

U.S. PATENT DOCUMENTS

| | | | |
|---|---|---|---|
| 3,368,031 | 2/1968 | Eisele | 358/86 |
| 4,367,557 | 1/1983 | Stern | 455/4 |
| 4,530,008 | 7/1985 | McVoy | 358/86 |
| 4,550,341 | 10/1985 | Naito | 358/86 |

Primary Examiner—Robert L. Griffin
Assistant Examiner—Curtis Kuntz
Attorney, Agent, or Firm—Wenderoth, Lind & Ponack

[57] ABSTRACT

A one-way addressable system includes a broadcasting center from which pay television signals and time codes representing time are produced, and subscriber's television receivers. The receiver includes a detector which produces a failure signal upon detection of a failure of a power supply along a primary power line, and produces an establish signal upon detection of an establish of the power supply along the primary power line. A secondary power source is provided for supplying power to the receiver when the failure signal is produced. A buffer is provided for storing newly received time code while the establish signal is present and for holding the same time code, which is received immediately before the generation of the failure signal, while the failure signal is present. A memory is provided for storing the time code shifted from the buffer in response to the receipt of a new time code to the buffer. A microcomputer calculates a time difference between the time codes maintained in the buffer and in the memory, thereby enabling the time count during the failure signal is present.

8 Claims, 4 Drawing Sheets

ONE-WAY ADDRESSABLE SYSTEM

BACKGROUND OF THE INVENTION

The present invention generally relates to a oneway addressable system such as used in the CATV system and, particularly, to the prevention of viewing of subscription, or pay, television programs by unauthorized subscribers which would result from disconnecting an addressable converter from an AC power outlet.

In the CATV system, in order for the billing to be accurately performed to TV subscribers of subscription television programs, or in order for some of the subscription television programs, which a particular CATV subscriber wishes to view, to be selectively received by a particular CATV subscriber according to their request, an addressable system is hitherto employed. According to the conventional addressable system, a unique address number is allocated to a CATV converter installed in a particular subscriber's home, which converter is at any time controlled by a command transmitted from a broadcasting center as a result of data transmission between the broadcasting center and the CATV converter in the subscriber's home. This addressable system has numerous advantages, some of which is that it is possible to restrict subscribers in arrears, i.e., the subscribers who have failed to pay the charge, from viewing a pay television program transmitted through the CATV system. Also, with respect to the change the particular subscriber has requested in receiving a television program, no service engineer needs to visit the subscriber and the change can be made by using a command from the center to the converter in the subscriber's home. Depending on the data transmission system the center and the CATV converter in the subscriber's home, the addressable system now widely used can be broadly classified into two types: one referred to as a one-way addressable system wherein the data transmission can be carried out only from the center to the CATV converter in the subscriber's home; and the other is referred to as a two-way addressable system wherein the data transmission can be carried out reciprocally between the center and the CATV converter in the subscriber's home.

The one-way addressable system is advantageous in that any existing one-way transmission components such as trunk amplifiers which are used in the conventional community antenna television system can be utilized for the data transmission under the addressable system and that the addressable system can be inexpensively introduced with no need to modify the data transmission system to cope with the two-way system, taking advantage of the existing coaxial network system, and therefore, the one-way addressable system is widely used in the United States of America and some other countries. The prior art construction utilizing this one-way addressable system is shown in FIG. 1 of the accompanying drawings.

Referring to FIG. 1, a broadcasting center arrangement 100 has a host computer 101 which generates a subscriber data through line 102 to a transmission control unit 103. The subscriber data is for controlling a one-way addressable converter 130 installed in a subscriber's home. The transmission control unit 103 performs a format conversion, a data storage and transmission speed conversion and some other functions based on the subscriber data and supplies a control data through line 104 to a data modulator 105. The pattern of the control data will be described later in connection with FIG. 3.

The subscriber data includes: an address number peculiar to a particular subscriber; authorized program information selected according to the subscriber's request; and control information used to disable an addressable converter in the unauthorized subscriber's home. A process, particularly, modulation and RF amplification, which are necessary for the control data to be sent through a coaxial transmission network, is carried out by a data modulator 105 which produces a modulated data signal through line 106. The modulated data signal is applied to a mixer 107 which also receives along line 109 a television signal carrying various pay television programs and usual television programs from an head end 108. At the head end 108, television signals for pay programs are scrambled with the use of a gated sync. suppppression technique so that non-subscribers and unauthorized television viewers can not watch the pay television programs.

The television signal on line 109 and the data signal on line 106 are mixed together in mixer 107, and the mixed signal is transmitted through a trunk cable 121. As apparent to those skilled in the art, the data signal transmitted through line 106 has a frequency so selected that it will not overlap with the frequency range of the television signal along line 109.

In data modulator 105, a modulation system based on FSK (Frequency Shift Keying) is used for facilitating the demodulation in the addressable converter. The signals after having been amplified by a trunk amplifier 120, are distributed to the subscriber's television set through a tap-off 122 by way of a drop cable 123.

One-way addressable converter 130 is coupled to each subscriber's television set 140. Addressable converter 130 has a distributor which receives the signal fed through the drop cable 123 and distributes the signal to a converter 133 through line 132 and also to a data demodulator 135 through line 134.

A receiver control data as produced from data demodulator 135 is applied through line 136 to a terminal control unit 137 in which the synchronization, and the error detection of the received control data are performed. Also in the terminal control unit 137, a key scan for the channel selection is carried out together with the detection of the control data. If it is so detected in terminal control unit 137 that an authorized channel or an authorized program is contained in the received data signal, a control signal is applied through line 138 to converter 133 for effecting the channel selection for selecting a frequency of the authorized channel or program. Thus, converter 133 produces a descrambled television signal of the authorized channel or program through line 139 to a television receiver 140, enabling the subscriber to watch the pay television program on the television set 140 using a scramble decoder (not shown).

A further detail of terminal control unit 137 will be described below in connection with FIG. 2. The control data from the data demodulator 135 is taken in a one-chip microprocessor 200 through a serial input port, and then, the serial-parallel conversion is carried out for making data of one character. Although in the example given above, one-chip microprocessor is used in the addressable converter, it is not always limited thereto, but a similar description can apply even where a multi-chip microprocessor is employed. The microprocessor searches synchronization code in the received data and checks the error. If the control data as detected has no error, it is stored in an internal RAM (not shown). Then, comparison is made between the address number contained in the control data with the address number read out from an address ROM 216 in which individual number (ID number) of the particular addressable converter is stored. If these two address numbers coincide with each other, the received control data is deemed as addressed to that particular addressable converter.

One example of a pattern of the control data 104 transmitted from the broadcasting center arrangement 100 to the addressable converter 130 is illustrated in FIG. 3.

If the individual ID number stored in the address ROM 216 and an address number 302 as contained in the control data transmitted from the broadcasting center coincide with each other, microcomputer 200 determines that the control data transmitted from the center is destined to that television receiver with that individual number. Thus, the command data 303 contained in the control data is used in that particular television receiver. In FIG. 3, SYN 301 is provided for indicating the beginning of the control data.

One-chip microcomputer 200 is usually supplied with a DC power from a power circuit (not shown) in the addressable converter through a power source line 207 and power selector 206. The power source line 207 is connected to a detector 213. Detector 213 detects the failure of the primary power supply through the power source line 207, when the line connected to the outlet is disconnected, and produces a power failure signal to microcomputer 200 through line 212 and also produces a control signal through line 209 to power selector 206. Upon receipt of the control signal, power selector 206 is actuated instantaneously to establish an secondary supply power from battery 203 through line 208 to microcomputer 200 and also to timer 210.

In the meantime, upon detection of the power failure signal from line 212, the microcomputer 200 stops its operation and, at the same time, stores various data contained in the RAM in the microcomputer. Thus, during the failure of primary power supply from the power source line 207, an secondary power, such as from battery 203, is used for holding the various data contained in the RAM and also for continuing the time counting by timer 210. The output of timer 210 is connected to microcomputer 200 through line 211 so that the microcomputer is informed of the content of timer 210.

Unlike two-way addressable system, the one-way addressable system may provide data only from the broadcasting center to each subscriber. Thus, it is not possible to detect at the broadcasting center the failure of the primary power supply in the subscribers. Therefore, there may be cases when the subscribers who do not want to pay the fees intentionally disconnect the line from the AC outlet so to as to cause the addressable converter not to recieve any further commands from the broadcasting center. Thus, the command for deauthorizing further program to those subscribers, in response to the failure of paying the fees, will not be received by the subscriber's addressable converter. Thus, such faithless subscribers can continue to receive the programs even after the deauthorize command has been dispatched.

In another case, when the primary power line is disconnected after the subscriber applies to the broadcasting center for changing his tier level, the command for changing the tier level from the broadcasting center may not be received by the addressable converter so that the subscriber continues to receive the programs according to the previous tier level. An extreme example for this case, called churn, may be such that the subscriber first applies for all the programs and, thereafter, cancels the programs but leaving only one program remained as wanted. Then, by disconnecting the addressable converter from the AC outlet, the command for cancelling the programs will not be received by the addressable converter. Thus, even after the cancellation, the subscriber may receive all the programs.

In order to avoid such a piracy in the one-way addressable converter, a timer is provided which counts time while the AC power is not supplied to the addressable converter from the outlet. For example, according to the prior art circuit shown in FIG. 2, upon detection of the failure of power supply through the power source line 207, detector 213 provides the power failure signal through line 212 to the microcomputer 200 which thereupon reads the time as indicated by timer 210. Then, when the power supply through the power source line 207 starts again, detector 213 provides power established signal through line 212 to microcomputer 200, which thereupon reads the time as indicated by timer 210. Microcomputer 200 further calculates a time period in which the power is cut, and compares the calculated time period with a predetermined reference time period. If the calculated time period is greater than the predetermined reference time period, microcomputer 200 is so programmed as to stop its function immediately.

According to the prior art one-way addressable system, a timer which must be actuated during the failure of the primary power supply is necessary, resulting in a high manufacturing cost.

Also, the necessity of the timer eventually calls for the need of an secondary power source, such as a battery, for providing power to the timer while the connection to the primary power source is cut. Usually a backup battery is provided to hold data in RAM until the reestablish of the primary power source, but such a backup battery has a very small capacity sufficient to hold data in RAM. If it is necessary to use the backup battery also for driving the timer, a battery with a greater capacity is necessary, resulting also in a high manufacturing cost.

Furthermore, according to the prior art one-way addressable system, it may be possible for a skilled peson to stop the timer to advance when the connection to the primary power source is cut. This may be accomplished simply by cutting the power supply to the timer.

SUMMARY OF THE INVENTION

The present invention has been developed with a view to substantially solving the above described disadvantages and has for its essential object to provide an improved one-way addressable system which can disable the addressable converter a predetermined reference time period after the disconnection of the power line from the power source without employing a timer.

It is also an essential object of the present invention to provide an improved broadcasting center employing the above described type one-way addressable system.

It is a further object of the present invention to provide an improved addressable converter for use in the above described type one-way addressable system.

In accomplishing these and other objects, a oneway addressable system includes a broadcasting center from which pay television signals and time codes representing time are produced, and subscriber's television receivers. The receiver includes a detector which produces a failure signal upon detection of a failure of a power supply along a primary power line, and produces an establish signal upon detection of an establish of the pwoer supply along the primary power line. A secondary power source is provided for supplying power to the microprocessor when the failure signal is produced. A buffer is provided for storing newly received time code while the establish signal is present and for holding the same time code, which is received immediately before the generation of the failure signal, while the failure signal is present. A memory is provided for storing the time code shifted from the buffer in response to the receipt of a new time code to the buffer. A microcomputer calculates a time difference between the time codes maintained in the buffer and in the memory, thereby enabling the time count during the failure signal is present.

BRIEF DESCRIPTION OF THE DRAWINGS

These and other objects and features of the present invention will become apparent from the following description taken in conjunction with preferred embodiments thereof with reference to the accompanying drawings, throughout which like parts are designated by like reference numerals, and in which.

DESCRIPTION OF THE PREFERRED EMBODIMENT

Figure 4:
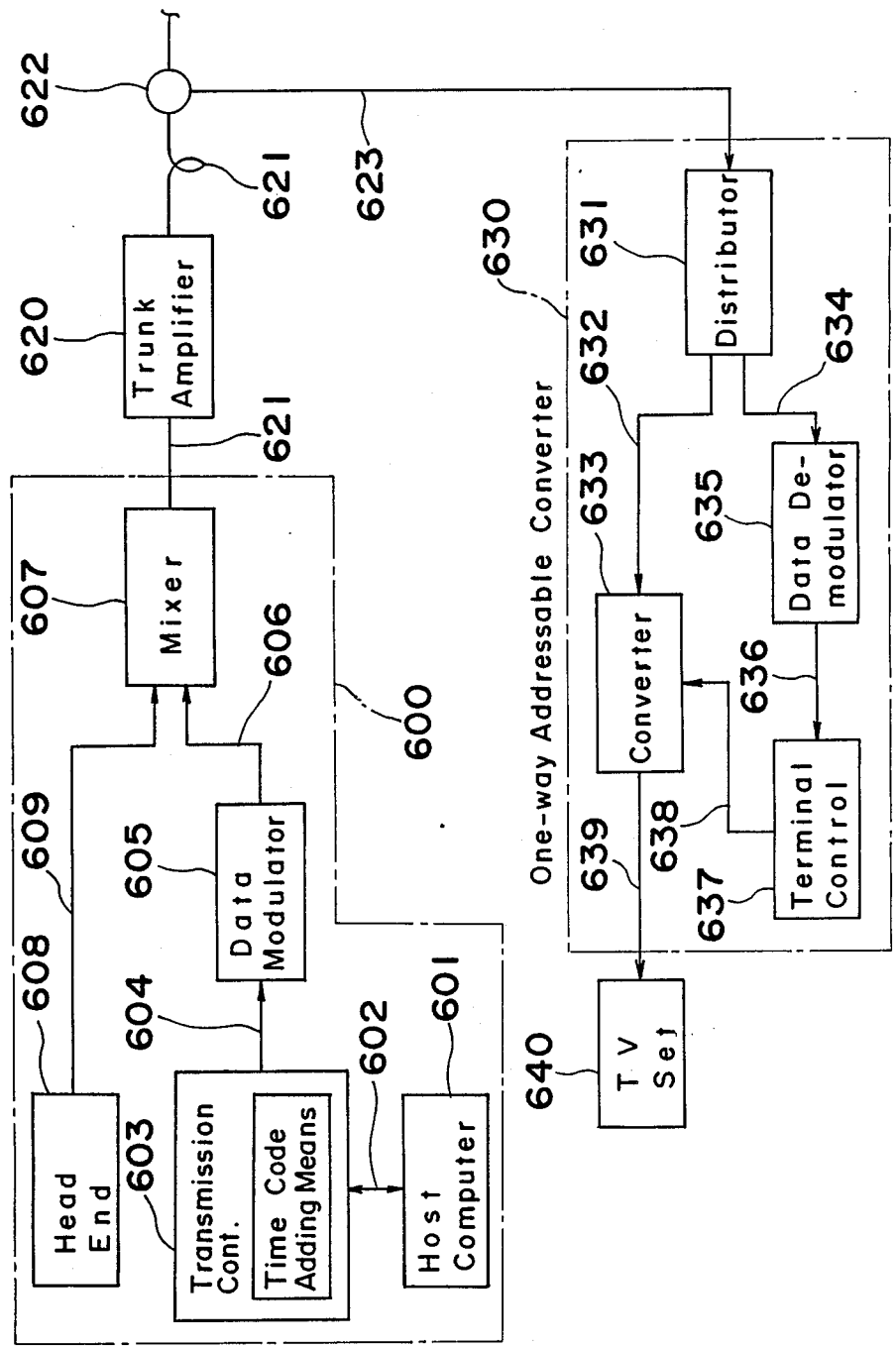
FIG. 4 is a circuit diagram showing a one-way addressable system according to the present invention.

Referring to FIG. 4, a one-way addressable system according to the present invention comprises a broadcasting center arrangement 600 and an addressable converter 630 coupled to a television receiver 640 of each subscriber.

The broadcasting center arrangement 600 has a host computer 601 which produces a subscriber data through line 602 to a transmission control unit 603. The subscriber data is for controlling the addressable converter 630 installed in a subscriber's television set. The subscriber data includes: an address number peculiar to a particular subscriber; subscriber program information; and control information used to disable an addressable converter in the subscriber's home which is used in the event that the subscriber has failed to pay the charge.

The transission control unit 603 performs a format conversion, a data storage and transmission speed conversion and some other functions based on the subscriber data and supplies a control data through line 604 to a data modulator 605. The control data as produced from transmission control unit 603 has the same pattern as that shown in FIG. 3.

Furthermore, according to a preferred embodiment of the present invention, the transmission control unit 603 has a time code adding means for adding a time code every after a predetermined number of control data. Time codes are prepared by the commands from host computer 601 such that host computer 601 supplies an initial data for preparing an initial time code T0 and an interval data, for example one hour period data, to transmission control unit 603. First, transmission control unit 603 prepares a time code T0 based on the initial data. Then, transmission control unit 603 holds the time code T0 during a first period determined by the period data, e.g., one hour. When the first period is over, the transmission control unit 603 changes the time code and holds a renewed time code T1 during the second period. In this manner, the time code stored in the transmission control unit 603 is renewed every after the period, e.g. one hour. The transmission control unit 603 produces time codes at predetermined short intervals, such as after every minute. Thus, during the first period (one hour), transmission control unit 603 produces time code T0 every one minute. Then, in the second period, transmission control unit 603 produces next time code T1 after every one minute. Thus, during each period, sixty time codes carrying the same time data are produced. It is to be noted that the time codes and control data are produced in a time sharing manner. Thus, between the neighboring two time codes, numbers of control data are produced from transmission control unit 603.

Figure 3:
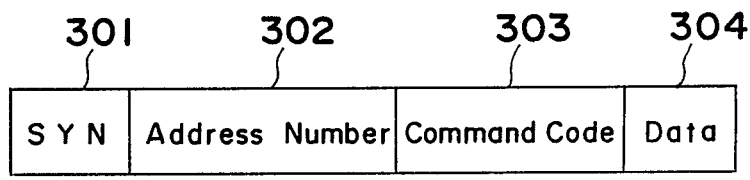
FIG. 3 is a diagrammatic view showing a pattern of a control data transmitted from the broadcasting center.

According to the preferred embodiment of the present invention, the time code has the same pattern as the control data, as shown in FIG. 3. In the case of control data, the block 302 shown in FIG. 3 carries an address number which is identical to one subscriber. Therefore, a number of control data carry different address numbers. However, in the case of time code, the block 302 carries an address number which is acceptable to all subscribers. Also, the data indicating the time, such as T0, is stored in the block 304.

A process, particularly, modulation and RF amplification, which are necessary for the control data and time code to be sent through a coaxial transmission network, is carried out by a data modulator 605 which produces a modulated signal through line 606. In data modulator 605, a modulation system based on FSK (Frequency Shift Keying) is used for facilitating the demodulation in the addressable converter. The modulated signal is applied to a mixer 607 which also receives along line 609 a television signal carrying various pay television programs and usual television programs from an head end 108. At the head end 608, the signals of the pay television programs are scrambled in a known manner, so that non-subscribers and unauthorized subscribers can not watch the pay television programs.

The television signals transmitted along line 609 and the control data and time codes transmitted along line 606 are mixed together in mixer 607, and the mixed signal is transmitted through a trunk line 621. The signals after having been amplified by a truck amplifier 620, are distributed to the subscriber's television set through a tap-off 622 by way of a drop cable 623.

Addressable converter 630 has a distributor 631 which receives the signal fed through the drop cable 623 and distributes the television signals to a converter 633 through line 632 and the control data and time codes to a data demodulator 635 through line 634.

The control data and time codes produced from data demodulator 635 are applied through line 636 to a terminal control unit 637 in which the synchronization, and the error detection of the received control data are performed. Also in the terminal control unit 637, a key scanning for the channel selection is carried out together with the detection of the control data and the time code. If it is so detected in terminal control unit 637 that an authorized channel or an authorized program is contained in the received signal, a control signal is applied through line 638 to converter 633 for effecting the channel selection for selecting a frequency of the authorized channel or program. Thus, converter 633 produces a descrambled television signal of the authorized channel or program through line 639 to a television receiver 640, enabling the subscriber to watch the pay television program on the television set 640 using a scramble decoder (not shown).

Figure 1:
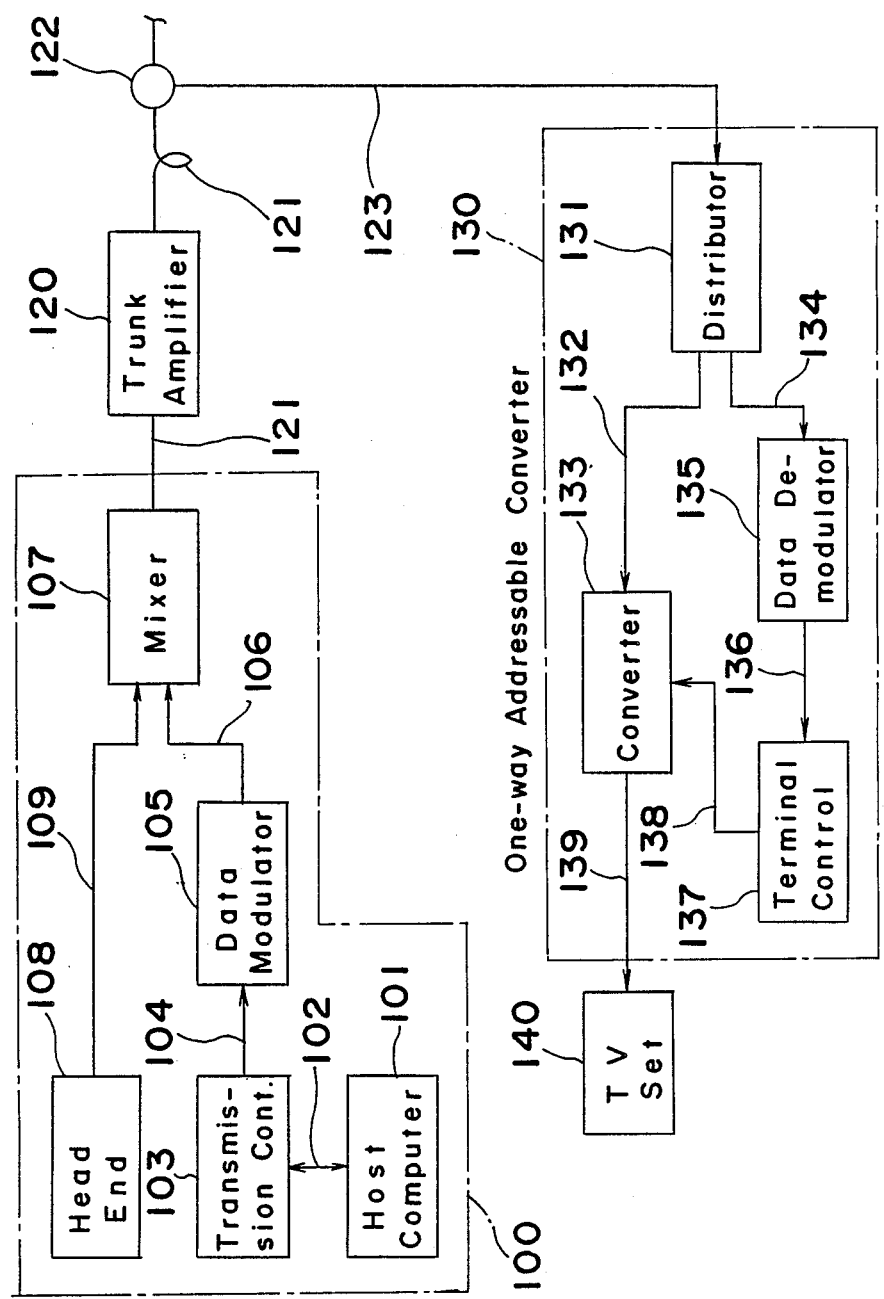
FIG. 1 is a circuit diagram showing a prior art oneway addressable system.
Figure 2:
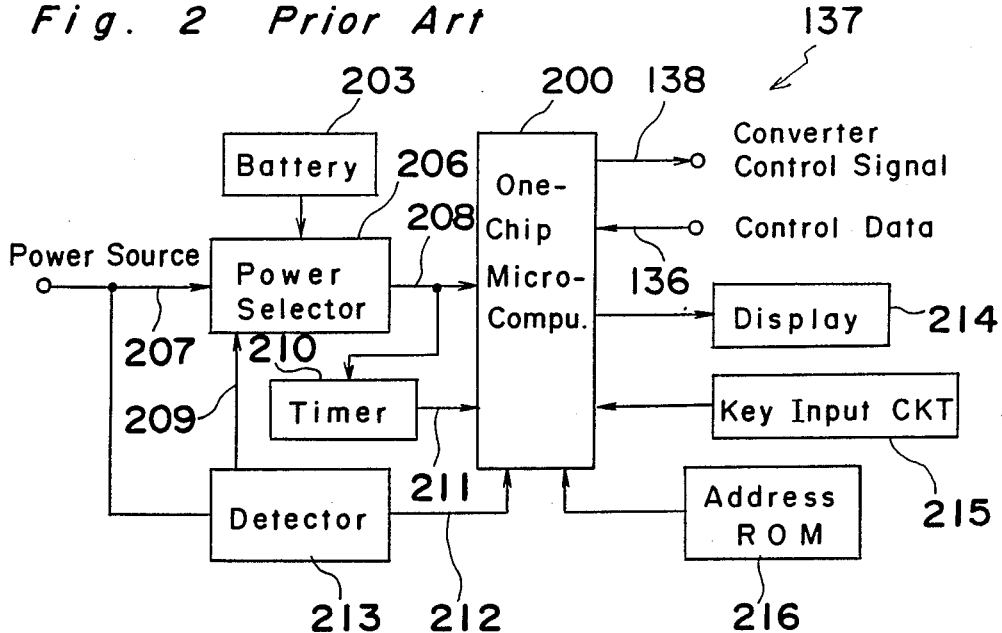
FIG. 2 is a circuit diagram showing a prior art addressable converter.
Figure 5:
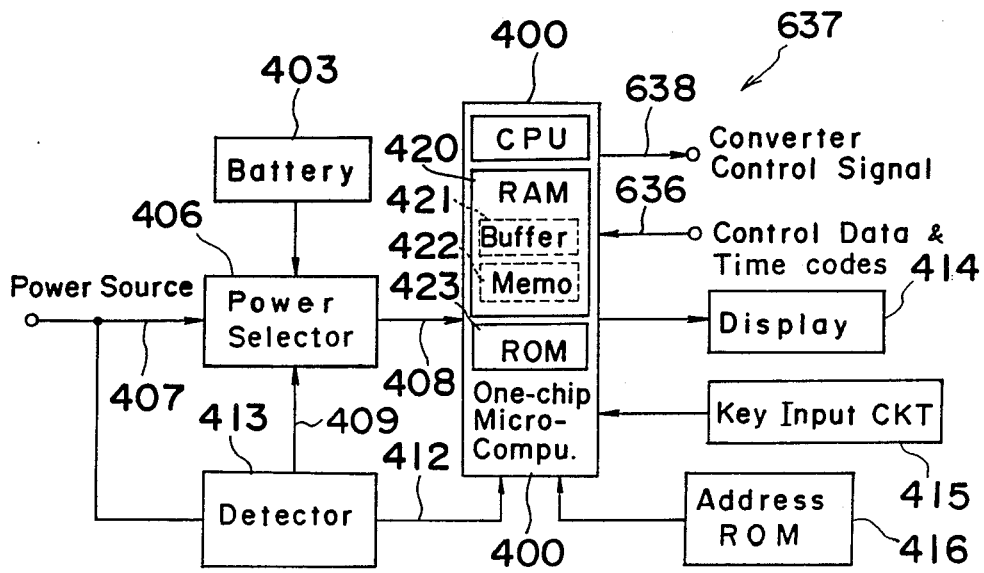
FIG. 5 is a circuit diagram showing an addressable converter employed in the system of FIG. 4.

Referring to FIG. 5, terminal control unit 637 according to a preferred embodiment of the present invention comprises one-chip microcomputer 400 which receives the control data and time codes from the data demodulator 635 through a serial input terminal. Instead of the one-chip microcomputer, it is possible to use a multi-chip microcomputer. Since the control data is processed in the same manner as the prior art, as described above in connection with FIG. 2, a detailed description therefore is omitted.

One-chip microcomputer 400 is usually supplied with a DC power from a power circuit (not shown) provided in the addressable converter through a power source line 407 and power selector 406. The power source line 407 is connected to a detector 413. Detector 413 detects the failure of the primary power supply through the power source line 407, such as when a blackout occurs or when the AC line connected to the AC outlet is disconnected, and produces a power failure signal to microcomputer 400 through line 412 and also produces a control signal through line 409 to power selector 406. Upon receipt of the control signal, power selector 406 is actuated instantaneously to establish an secondary supply power from battery 403 through line 408 to microcomputer 400.

In the meantime, upon detection of the power failure signal from line 412, the microcomputer 400 stops its operation and, at the same time, stores various data contained in the RAM in the microcomputer. Thus, during the failure of primary power supply from the power source line 407, an secondary power, such as from battery 403, is used for holding the various data contained in the RAM.

According to the present invention, the time period during the power failure is counted in the folowing manner.

Figure 6:
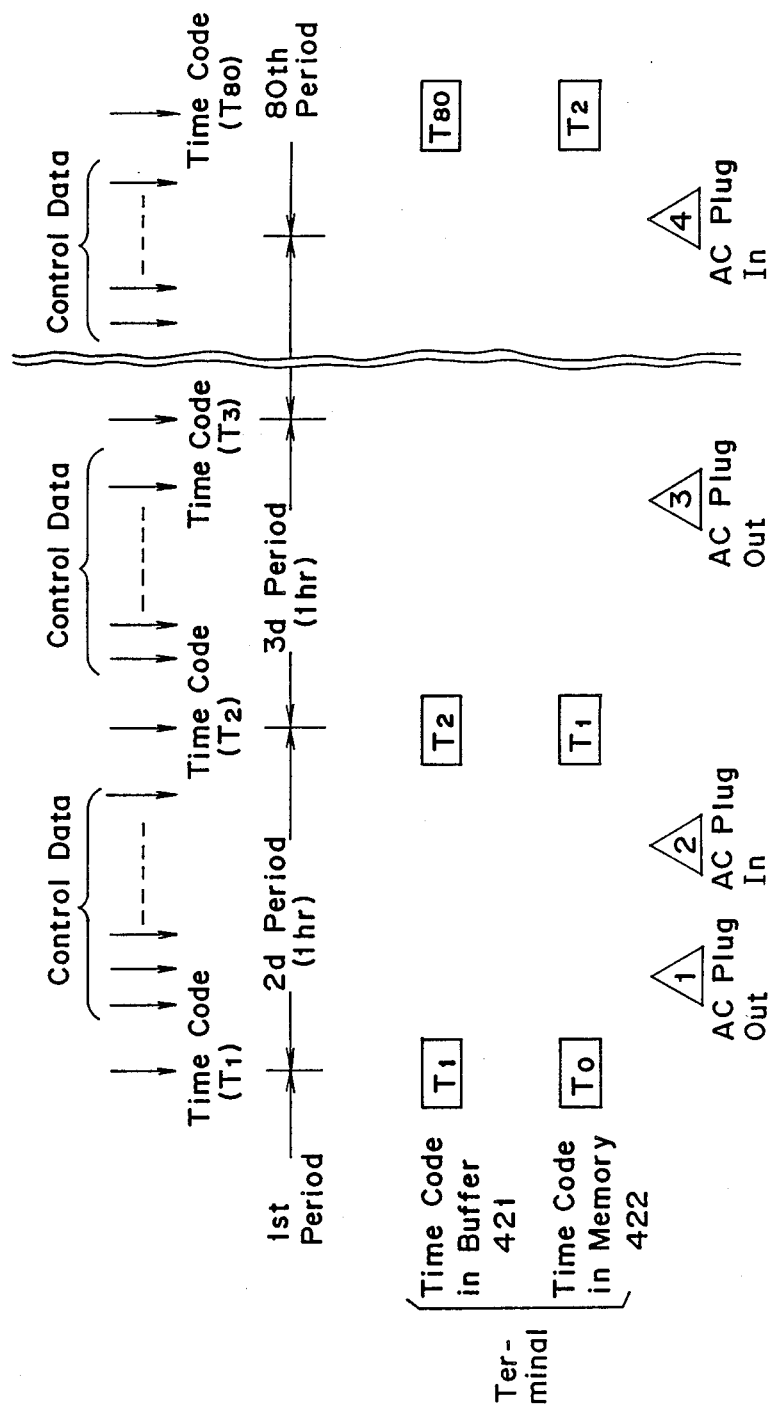
FIG. 6 is a time chart showing an operation of the one-way addressable system of the present invention.

The time codes provided to microcoputer 400 are all taken into RAM 420, particularly in buffer 421. When the same time codes, for example time codes T0, are transmitted to microcomputer 400, buffer 421 continues to hold the same time code T0. Then, when microcomputer 400 receives a different time code, e.g., T1, the time code T0 in the buffer 421 is transferred to a memory 422, and at the same time, the new time code T1 is stored in buffer 421. The time chart shown in FIG. 6 shows the change of time codes stored in buffer 421 and those stored in memory 422. In FIG. 6, only the first time code at the beginning of each one hour period is shown. When buffer 421 and memory 422 respectively receive new time codes, a difference between the time code in buffer 421 and the time code in memory 422 is calculated. Then, the calculated difference is compared with a predetermined reference time period, such as that equal to 48 hours. If the difference is equal to or shorter than the predetermined reference time period, microcomputer 400 continues to operate without any change. However, if the difference is greater than the predetermined reference, microcomputer 400 stops its function to disabled the channel selection function and descramble operation. Thus, the television set 140 can not receive the pay television programs, but can receive only the non-pay television programs.

The operation is explained in connection with FIG. 6. At the beginning of the second period, microcomputer 400 starts to receive a new time code T1. Thus, the time code T0 in buffer 421 is shifted to memory 422 and the new time code T1 enters in buffer 421. Thus, buffer 421 stores the new time code T1, and memory 422 stores the time code T0 which has been held in buffer 421. When the time codes in buffer 421 and memory 422 are renewed, the difference between time codes stored in buffer 421 and memory 422, i.e., between time codes T1 and T0 is calculated, and the calculated result is compared with the predetermined reference time period, such as that equal to T48 (48 hours). Since the calculated result is smaller than the predetermined reference time period, microcomputer 400 continues to operate with no failure.

Then, when the AC plug is pulled out at a time indicated by a triangle 1 to cut off the primary power source, battery 403 supplies a backup power to microcomputer 400 to maintain the data stored in RAM 420. Thus, time codes T1 and T0 are stored in buffer 421 and memory 422, respectively. Then, if the AC plug is plugged in before 48 hours has elapsed, such as at a time indicated by a triangle 2, buffer 421 stores the time code T1. Then, the difference between the time codes in buffer 421 and memory 422 is calculated. In this case, since the difference is zero, which is smaller than the reference time period, the microcomputer 400 continues to operate with no failure.

Thereafter, when a new time code T2 is applied to buffer 421 at the beginning of the third period, buffer 421 stores the new time code T2 and the time code T1 which has been stored in buffer 421 is shifted to memory 422. Then, the difference between the time codes T2 and T1 in buffer 421 and memory 422 is calculated. In this case, since the difference therebetween is equal to one period (one hour), the calculated result is smaller than the reference time period, thereby continuing the operation of microcomputer 400.

Then, when the AC plug is pulled out at a time indicated by a triangle 3, battery 403 supplies the backup power to microcomputer 400 to maintain the data stored in RAM 420. Thus, time codes T2 and T1 are maintained in buffer 421 and memory 422, respectively. Then, if the AC plug is plugged in after 48 hours has elapsed, such as at a time indicated by a triangle 4, buffer 421 receives and stores a new time code T80 and the time code T2 which has been stored in buffer 421 is shifted to memory 422. Thus, after the time indicated by triangle 4, buffer 421 and memory 422 store time codes T80 and T2, respectively. Then, the difference between the time codes in buffer 421 and memory 422 is calculated. In this case, since the difference is equal to 78 periods (78 hours), which is greater than the reference time period (48 hours), the microcomputer 40 stops tuning and descrambling functions immediately to disable the television set to receive the pay television programs, but only the normal television programs can be received.

According to the present invention, it is possible to count the time when the primary power source is cut off without using any timer. Therefore, the addressable converter used in the one-way addressable system, according to the present invention, can be manufactured at a low cost. Furthermore, since the timer is not necessary, it is not necessary to employ a backup battery having a relatively large capacity to operate the timer while the primary power source is cut off.

According to the present invention, the reference time period may be changed by commands transmitted from the broadcasting center to the subscriber's addressable converter. For example, during the summer vacation season, the refrence time period may be extended to one week (168 hours).

Also, in the above described example, the time codes are produced from the broadcasting center at one minute intervals. The intervals may be made shorter or longer that one minute.

Furthermore, according to the present invention, the same time code is transmitted cyclically during the same time period, so the converter receives the same time code cyclically and checks this time code. The receiver can be so arranged that it can detect the time code only when the time codes of the same kind are received successively, so that it is possible to prevent buffer 421 from receiving error time codes in poor signal condition.

Furthermore, in the above example, the calculation to obtain the difference between the time codes in buffer 421 and memory 422 is carried out whenever a new time code is applied to buffer 421, but instead, it is possible to carry out the calculation only when the primary power supply is established.

Although the present invention has been fully described with reference to a preferred embodiment, many modifications and variations thereof will now be apparent to those skilled in the art, and the scope of the present invention is therefore to be limited not by the details of the preferred embodiment described above, but only by the terms of the appended claims.

What is claimed is:

1. A one-way addressable system comprising:
   a broadcasting center from which information signals and time codes are produced, said time code representing time;
   a transmission means for sending said information signals and time codes therethrough; and
   receiver means for receiving said information signals and time codes, said receiver means comprising:
   a connecting means adapted for the connection with a primary power source;
   a secondary power source for supplying power to said receiver when said connection means is disconnected;
   a storing means for storing the up dated time code while said connecting means is connected to said primary power source, and for maintaining the same time code while said connecting means is disconnected; and
   subtracting means for obtaining a time difference between the time code maintained in said storing means since when said connecting means has been disconnected and a new time code obtained when said connecting means is connected again;
   thereby enabling the time count during the disconnection of the connecting means.

2. In a one-way addressable system for sending data only from a broadcasting center, from which information signals and time codes representing time are produced, to a receiver, wherein said receiver comprises:
   detecting means for producing a failure signal upon detection of a failure of a power supply along a primary power line, and for producing an establish signal upon detection of an establish of the power supply along said primary power line;
   a secondary power source for supplying power to said receiver when said failure signal is produced;
   first storing means for storing newly received time code while said establish signal is present and for holding the same time code, which is received immediately before the generation of said failure signal, while said failure signal is present;
   second storing means for storing the time code shifted from said first storing means in response to the receipt of a new time code to said first storing means; and
   subtracting means for obtaining a time difference between the time code maintained in said first storing means and the time code in said second storing means, thereby enabling the time count during said failure signal is present.

3. A receiver as claimed in claim 2, further comprising a comparator means for comparing said time difference with a reference time period.

4. A receiver as claimed in claim 3, wherein said comparator means produces a disable signal to disable the receiving of said information signals when said time difference is greater than said reference time period.

5. A receiver as claimed in claim 3, wherein said reference time period can be varied in accordance with a command signal produced from said broadcasting center.

6. A receiver as claimed in claim 2, wherein said primary power source is a commercial AC power source.

7. A receiver as claimed in claim 2, wherein said secondary power source is a battery.

8. A receiver as claimed in claim 2, further comprising an extracting means for extracting said time codes in the signal received from said broadcasting center.

* * * * *